United States Patent [19]

Yoshiwara et al.

[11] Patent Number: 4,750,947
[45] Date of Patent: Jun. 14, 1988

[54] METHOD FOR SURFACE-ALLOYING METAL WITH A HIGH-DENSITY ENERGY BEAM AND AN ALLOY METAL

[75] Inventors: Seishiro Yoshiwara; Takao Kawanami, both of Kitakyushu, Japan

[73] Assignee: Nippon Steel Corporation, Tokyo, Japan

[21] Appl. No.: 28,080

[22] Filed: Mar. 19, 1987

Related U.S. Application Data

[63] Continuation of Ser. No. 697,409, Feb. 1, 1985, abandoned.

[51] Int. Cl.⁴ .............................................. C22C 33/00
[52] U.S. Cl. .................................. 148/12 R; 148/13; 148/14; 148/129; 148/590; 219/121 LF; 219/121 LG; 219/121 LM; 420/590

[58] Field of Search .................. 219/121 LE, 121 LF, 219/121 LG, 121 LN, 121 L, 121 LM; 148/4, 12 R, 13.1, 13, 14, 129; 420/590

[56] References Cited

PUBLICATIONS

Making Shaping & Treating U.S. Steel, 1973, pp. 590–593, 574, 575.

Primary Examiner—Christopher W. Brody
Attorney, Agent, or Firm—Kenyon & Kenyon

[57] ABSTRACT

The surface of a base metal is alloyed with the aid of a laser or electron beam which locally melts the surface. During the alloying, defects are prevented from occurring due to the use of an deoxidizing agent and a low-melting-point metal having a lower melting point than than of the base metal.

9 Claims, 4 Drawing Sheets

METHOD FOR SURFACE-ALLOYING METAL WITH A HIGH-DENSITY ENERGY BEAM AND AN ALLOY METAL

This application is a continuation of application Ser. No. 697,409, filed Feb. 1, 1985 now abandoned.

BACKGROUND OF THE INVENTION

1. Field of the Invention

The present invention relates to a method for surface-alloying metal by utilizing a high-density energy beam, such as a laser beam or an electron beam, and to a surface-alloyed steel. The present invention also relates to a method for working the surface-alloyed metal by the above method.

2. Description of the Related Art

The methods for surface-alloying metal by means of a laser beam or an electron beam presently in the process of development cannot be applied industrially since they involve the problems of the dragging of oxides, the generation of blowholes, nonuniform distribution of an additive, a poor surface roughness, and the like. In addition, laser beams and electron beams are expensive energy sources and, hence, cannot compete well with less expensive energy sources. Nevertheless, since high-density energy such as a laser beam or an electron beam can be easily controlled and can provide a working means for a completely automatic working plant, the provision of a method for surface-alloying metal by means of high-density energy and the subsequent metal-working method is desired in the present field. The working herein means any treatment for providing metal with a surface property and a shape which make the metal appropriate for use as machine parts and tools and for other industrial applications.

It is known to irradiate the surface of metallic material with a high-density energy beam while an additive is sprayed onto the surface. In this alloying method, the concentration of the alloying element(s) is nonuniformly distributed in the molten metal. Especially when a laser beam is used, the high-speed gas stream used for blowing out the plasma cloud scatters the additive, resulting in a reduction of the concentration of the additive in the melt.

It is also known to melt the additive in the form of a wire or a ribbon by means of a high-density energy beam and to drop the molten additive onto a surface of the metallic material while irradiating it with a high-density energy beam. This alloying method also does not provide a uniform concentration of the alloying element(s) in the molten metal.

The known methods do not provide certain qualities and a lower production cost of the surface-alloyed metal, and therefore they are not industrially applied.

The present applicant tried to improve the known methods mentioned above by melting a surface of a base metal which had undergone the application or fusion-bonding of an additive. The improvement was appreciable. However, the tried method could not be practiced.

SUMMARY OF THE INVENTION

An object of the present invention is to provide a method for working metal by which the surface layer of the metal is alloyed to impart improved properties thereto.

Another object of the present invention is to provide a method for smoothening a ripple-like surface of the metal formed during an alloying step of the working method mentioned above.

A further object of the present invention is to lessen the amount of high-density energy, which is expensive, and to provide a surface-alloying method by means of high-density energy, which method provides a high working ability and a reasonable price.

Yet a further object of the present invention is to provide an alloy steel which comprises a base made of alloy steel and a surface-alloyed layer enriched with an alloying element(s).

According to a method of the present invention, a deoxidizing agent and a metal having a lower melting point than that of the base metal are applied to or fusion-bonded to the surface of the base metal and are subsequently melted together with the base metal by means of a high-density energy beam such as a laser beam or an electron beam. In the method of the present invention, the low-melting-point metal, which has a lower melting point than that of the base metal, is contained in the additive and begins to melt when the high-density energy beam approaches the additive. The low-melting-point metal can be an deoxidizing agent. The low-melting-point metal is melted around the molten part of the base metal and does not scatter. The low-melting-point metal also prevents any other material of the additive from scattering. Thus, the recovery of an alloying element(s) in the melt is enhanced and the alloying element(s) is uniformly distributed in the melt. The deoxidizing agent consists of metal which is more oxidizable than the base metal. When the base metal is steel or a steel alloy, the deoxidizing agent contains at least one member selected from the group consisting of aluminum (Al), silicon (Si), manganese (Mn), titanium (Ti), zirconium (Zr), vanadium (V), and an alloy thereof. The deoxidizing agent contained in the additive prevents oxides from being dragged into the melt and the generation of blowholes. The deoxidizing agent reduces any metal oxide, suppresses the rimming action of the molten metal, and causes the floatation of deoxidization products having a lower specific weight than that of the alloy melt.

The method provided in accordance with the objects of the present invention comprises: applying or fusion-bonding to the base metal an additive comprising a deoxidizing agent which is more oxidizable than the base metal and a metal which has a lower melting point than that of the base metal; displacing the source of a high-density energy beam relative to the base metal; and melting both the deoxidizing agent and the low-melting-point metal under the applied or fusion-bonded state at the same location.

According to an embodiment of the method of the present invention, the additive comprises at least one member selected from the group of metals consisting of Al, Sn, Cu, TiFe, TiAl$_3$, and suboxides thereof, the member having a lower melting point than that of steel and a steel alloy, which are base metals.

According to another embodiment of the present invention, the additive comprises at least one alloying element selected from the group consisting of nickel, chromium, cobalt, tungsten, vanadium, molybdenum, copper, carbon, and silicon.

According to an embodiment of the present invention, a high-density energy beam is used together with another heat source which is less expensive than the high-density energy beam.

A second heat source may impart to the additive and base metal a substantial part of the heat energy required for surface-alloying.

In this embodiment, the working ability of the heat source is enhanced by utilizing the advantages of the respective energy sources, the thermal impact due to a laser beam or the like is mitigated, and thermal cracks can be further suppressed.

According to another embodiment of the present invention, during or directly after solidification of the molten part of the base metal, a ripple-like surface of the solidified base metal is smoothly formed by applying a forming force thereto. In this embodiment, the blowholes and cracks disappear simultaneous with the smoothening of the ripple-like surface, and, further, the generation of cracks during cooling can be prevented.

According to still another embodiment of the present invention, the solidified part of the base metal which has been alloyed with the aid of a high-density energy beam is cut with a high-density energy beam. On the so-cut cross section of the base metal, an alloyed layer with a uniform concentration is exposed. The cut sections having this exposed alloyed layer can be used to produce cutters and heat-resistant and wear-resistant tools.

According to a further embodiment of the present invention, second heat sources comprising a burner or an induction heater are disposed in front of and/or behind the irradiation area of a high-density energy beam. The second heat source is a supplementary heat source for decreasing the energy of the high-density energy beam and/or for enhancing the working ability and is effective for preventing thermal cracks.

The additive may further comprise a powder to be added to the base metal. The powder is not restricted to a specific kind but can be metal, metal oxide, metal carbide, or ceramic powder. The complete melting of this powder by a high-density energy beam is not necessary. The powder can be suspended in solid form in the molten metal and then incorporated into the surface-alloy layer upon solidification of the molten metal. When the base metal is steel or a steel alloy and when it is intended to improve its heat-resistant and wear-resistant properties, at least one member selected from the group consisting of nickel, chromium, cobalt, tungsten, molybdenum, copper, silicon, and their oxides and carbides is preferably contained, in the form of a powder, in the additive.

An alloy steel provided by the present invention consists of a metal base and a surface-alloy layer, wherein the surface-alloy layer comprises a metal having a lower melting point than that of the base metal, a deoxidation product, and an alloying element which is enriched in the surface-alloy layer, and, further the surface-alloy layer is solidified on said base metal by solidification of melt formed by utilizing a high-density energy beam.

An alloy steel according to the present invention can be advantageously used for a rolling tool, an engine part, or a die when it comprises: (1) a metal base essentially consisting of from 0.20% to 1.60% of C, from 0.30% to 0.80% of Si, from 0.30% to 1.50% of Mn, from 0.2% to 6.0% of Cr, and from 0% to 5.0% of Ni, the balance being Fe, and (2) a surface-alloy layer having a thickness of from 0.1 to 7.0 mm, containing at least one element selected from the group consisting of Ni, Cr, Mo, W, V, Co, Cu, C, Si, and alloys thereof, preferably in an amount of from 0.2% to 20%, and produced by the surface-alloying method described above.

Another alloy steel which can be advantageously used for a rolling tool, an engine part, or a die comprises: (1) a metal base essentially consisting of from 0.20% to 0.60% of C, up to 0.40% of Si, from 0.30% to 10.0% of Mn, from 0.2% to 24.0% of Cr, and from 0.02% to 0.60% of Ni, the balance being Fe, and (2) surface-alloy layer having a thickness of from 0.1 to 0.7 mm, containing at least one element selected from the group consisting of Ni, Cr, Mo, W, V, Co, Cu, C, and alloys thereof, preferably in an amount of from 0.2% to 20%, and produced by the surface-alloying method described above.

Still another alloy steel which can be advantageously used for a rolling tool, an engine part, or a die comprises: (1) a metal base essentially consisting of up to 0.30% of C, up to 1.5% of Si, up to 2.0% of Mn, from 10% to 40% of Ni, and from 12% to 26% of Cr, the balance being Fe, and (2) a surface-alloy layer having a thickness of from 0.1 to 7.0 mm, containing at least one element selected from the group consisting of Ni, Cr, Mo, W, V, Co, Cu, C, and alloys thereof (preferably in an amount of from 0.2% to 20%), and produced by the surface-alloying method described above.

A rolling tool herein is a part of a roller, etc. An engine part herein is a valve seat, or the like. A die herein is used for metal-working by drawing, extruding, or the like.

DESCRIPTION OF THE PREFERRED EMBODIMENTS

A high-density energy beam used in the method of the present invention is a laser beam, an electron beam, or another energy beam which is focussed to have an energy density of $10^3$ W/cm$^2$ or more. An alloying element(s) is added to a surface part of a metal which is locally melted by the high-density energy beam. When the high-density energy beam is used for the irradiation of a surface of metallic materials, instantaneous melting of this surface is caused except for the polished material having a high reflectivity and a few materials, such as pure copper, having a high thermal conductivity.

The additive mentioned above comprises a low-melting-point metal and a deoxidizing agent. This does not mean that two or more kinds of metal are contained in the additive since the low-melting-point metal can be more oxidizable than the base metal.

The additive may further comprise a minor amount of a slag-forming agent such as fluorspar, limestone, ilmenite ($TiO_2.FeO$), or titanium oxide, all of which are usually used as a raw material in steelmaking or welding, and material which can enhance the adhesiveness of the applied or fusion-bonded low-melting-point metal and deoxidizing agent. The slag-forming agent and the adhesiveness-enhancing agent are in the form of powder, and this enables the obtainment of effects which are superior to those obtained by the use of an additive without the use of a slag-forming agent or the like.

The additive may further comprise a heat-resistant material or coarse particles provided that a surface part thereof can be melted. In other words, the heat-resistant material or coarse particles may not be melted at the core thereof by the high-density energy beam.

The additive consists of the following material or materials having the respective functions: (1) a deoxidizing agent which is more easily oxidizable than the base metal, (2) a surface-wetting agent having a melting point lower than that of the base metal, and (3) an alloying element enhancing such properties of a solidified metal as required for the use of the surface-alloyed product. The additive preferably further contains an improving agent for enhancing one or more of the functions described above and for facilitating the preparation operation and the finishing-working of surface-alloying.

The additive described above needs to be present where and when a surface of the base metal is locally melted by the high-density energy beam. Since the additive is melted due to being fusion-bonded to the surface of a base metal, in the case of fusion-bonding, the low-melting-point metal contained in the additive has already undergone melting when the source of a high-density energy beam is displaced relative to the stationary base metal along one direction so as to successively advance local melting parts along this one direction. That is, the additive is fusion-bonded behind the local melting parts as seen in the advancing direction of the source of the high-density energy beam.

In the method of the present invention using a laser beam, the molten part is covered by a protective atmosphere of inert gas, such as argon or helium, or gas, such as nitrogen, which does not react easily with the melt so as to prevent oxidation of the melt due to air or air dragging.

Table 1 below shows an example of the method according to the present invention, a known method, and a comparative method, all of these methods being based on the utilization of a laser beam.

The base metal is a cast low-alloyed steel containing 0.31% of carbon, 0.41% of silicon, 0.60% of manganese, 2.88% of chromium, and 1.17% of nickel.

In the known method, the additive is free of an deoxidizing agent and a metal having a lower melting point than the base metal but contains molybdenum powder as an alloying agent and silicon resin as a vehicle. The viscosity of the additive is adjusted with a thinner and then the additive is applied on the base metal with a brush to a coating thickness of 0.7 mm. The coating surface of the base metal is irradiated with a laser having a power of 10 kW, and the laser is displaced relative to the base metal at a speed of 40 mm/sec.

The comparative method is the same as the known method except that titanium as a deoxidizing agent is additionally contained in the additive.

The applicant attempted, in the comparative method, to suppress the generation of blowholes with the aid of a deoxidizing agent. The generation of blowholes could be suppressed, but thermal cracks were generated.

The inventive method (1) is the same as the known method except that titanium as a deoxidizing agent and aluminum as a low-melting-point metal are used.

In the inventive method (2), aluminum plays the role of both deoxidizing agent and low-melting-point metal. Except for the use of aluminum, the inventive method (2) is the same as the known method.

The inventive method (3) is the same as the known method except that silicon is used as the deoxidizing agent and tin is used as the low-melting-point metal.

In the inventive methods (1), (2), and (3), although some thermal cracks were generated, they were virtually non-detrimental, i.e., 0.5 mm or less in size, which can be seen as an improvement over the known method and even over the comparative method.

The dendrite spacing of the molten and then solidified surface layer was approximately 5 microns according to the inventive methods (1), (2), and (3) and was considerably less than 50–100 microns of the base metal. This indicates advantageous refinement of the structure of the surface-alloyed layer as compared to that of the base metal.

The well-known effect of the deoxidizing agent in the deoxidizing reactions in steelmaking is attained in the surface-alloyed layer and results in the prevention of blowholes.

One effect of the low-melting-point metal is that it compensates for impairment of the adhesiveness of the resin during temperature elevation and plays the role of a coating-adhesive agent at a high temperature. Another effect of the low-melting-point metal is that it mitigates the thermal shock imparted by the high-density energy beam to the additive and the base metal. A further effect of the low-melting-point metal is that it prevents the base metal and the alloying element(s) from being oxidized. In order to strengthen the effects of the low-melting-point metal, the additive may further comprise a substance which can improve the wettability thereof.

TABLE 1

|  | Known Method | Comparative Method | Inventive Method (1) | Inventive Method (2) | Inventive Method (3) |
|---|---|---|---|---|---|
| Base Metal | low-alloyed steel | ← | ← | ← | ← |
| Deoxidizing Agent | none | titanium | titanium | aluminum | silicon |
| Low-Melting-Point Metal | none | none | aluminum | aluminum | tin |
| Alloying Element | molybdenum | ← | ← | ← | ← |
| Adding Method | applied with brush | ← | ← | ← | ← |
| Resin in Applied Agent | silicon resin | ← | ← | ← | ← |
| Solvent | thinner | ← | ← | ← | ← |
| Thickness of Coating (mm) | 0.7 | ← | ← | ← | ← |
| Heat Source | laser beam | ← | ← | ← | ← |
| Power of Energy Source (Kw) | 10 | ← | ← | ← | ← |
| Penetration Depth (mm) | 7 | ← | ← | ← | ← |
| Alloying Amount (%) | 1 | 2 | 6 | 6 | 6 |
| Blowholes | large | small | small | small | small |
| Thermal Cracks | large | large | small | small | small |

The surface-alloying method using an electron beam was carried out. The conditions of this method were the same as those given in Table 1 except for the following.

Molten aluminum having a temperature of 700° C. and containing molybdenum powder was deposited on the workpieces. The workpieces were displaced relative to the electron beam source having a power of 10 kw at a speed of 60 mm/sec. The penetration depth was 8 mm.

The same results as those described with reference to Table 1 were obtained.

In addition to molybdenum, nickel, chromium, chromium carbide, tungsten, tungsten carbide, and cobalt were added, respectively, to the aluminum melt. It was revealed that in the case of adding nickel and the like the present invention was effective for suppressing the generation of blowholes and thermal cracks.

BRIEF DESCRIPTION OF THE DRAWINGS

Referring to FIGS. 1 through 4, an embodiment of the method according to the present invention, in which a laser beam and a second heat source are used, is illustrated. A second heat source 2 located a predetermined distance from the laser-beam condenser 1 preheats the workpiece. The workpiece advances in the direction of the arrow 3 and then is heated by the laser beam 4. The alloying element (A) is added to the heated and the melted surface of the workpiece.

Figure 5:
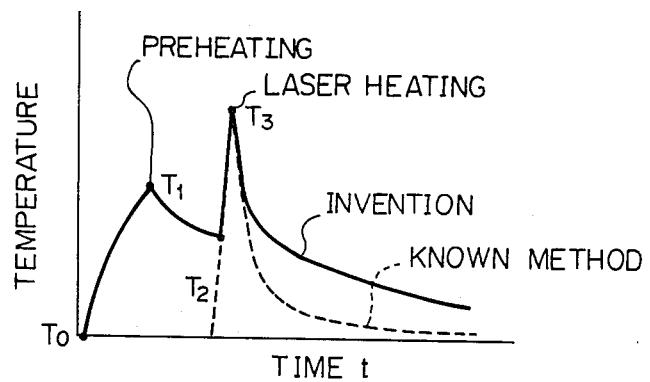
FIGS. 5 and 6 illustrate the relationship between the surface temperature of a workpiece and the working time according to the method of the present invention and according to a known method.

A temperature change in the workpiece occurs, as shown in FIG. 5. That is, the preheating by the second heat source 2 causes a temperature change of from $T_0$ to $T_1$ and the heating by the laser beam causes a temperature change of from $T_2$ to $T_3$. The base metal is melted due to heating up to $T_3$.

According to a known method, heating from a temperature of $T_0$ to a temperature of $T_3$ must be carried out by the laser beam. Contrary to this, according to the present invention, the heating by the laser beam is merely a heating for bringing the temperature $T_2$, which is decreased less than the preheating temperature due to cooling, to the temperature $T_3$. Thus, it is possible, according to the present invention, to either keep the power of the laser beam at a low level or to increase the working speed without increasing the power of the laser beam.

The cooling rate from the heating temperature is slow in accordance with the present invention as compared with the known method since the workpiece is preheated in the method of the present invention.

Figure 6:
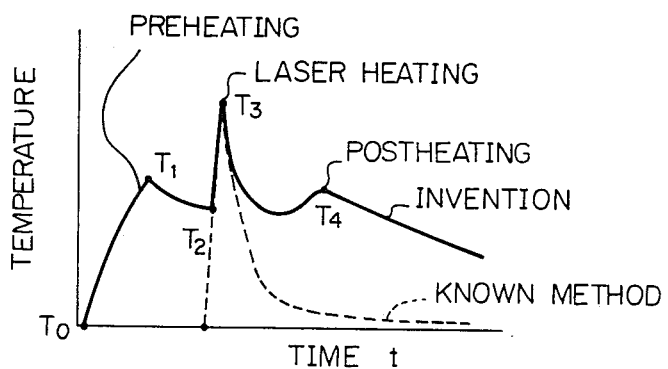

The second heat source 2' (FIGS. 1 through 4) is located behind the laser-beam condenser 1 so as to retard the cooling rate of the workpiece and to prevent the occurrence of thermal cracks. If necessary, the second heat source 2' can be utilized to adjust the hardness of a surface-alloyed layer. When the second heat sources 2, 2' are used, the temperature changes as shown in FIG. 6. The temperature change of from $T_0$ to $T_1$ occurs as a result of preheating with the second heat source 2, and the temperature change of from $T_2$ to $T_3$ occurs as a result of heating with the laser beam. During the heating, an intended working is carried out. Directly after the working, postheating with the second heat source 2' is carried out until a temperature $T_4$ is obtained.

Figure 2:
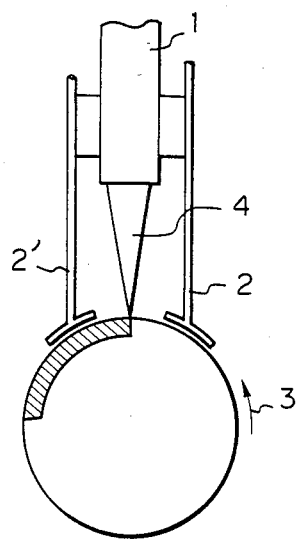
Figure 4:
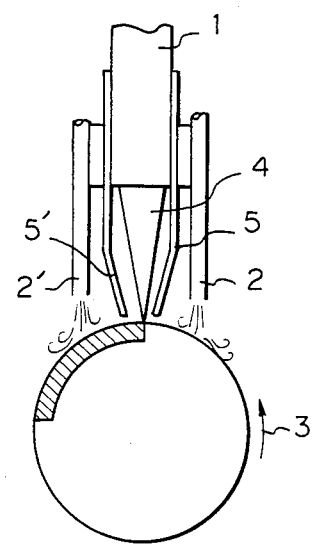

Referring to FIGS. 2 and 4, a rotary body (workpiece) is subjected to working during feeding along the axial direction thereof. The preheated and post-heated parts of the workpiece may be adjacent to one another, as shown in FIGS. 2 and 4, depending upon the working method. When the preheated and post-heated parts of a workpiece are adjacent to one another, a single heat source can be used as the second heat sources 2, 2'.

Figure 1:
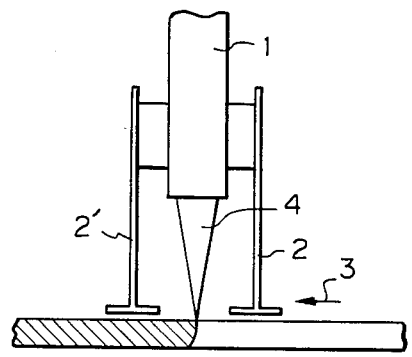
FIGS. 1 through 4 illustrate an embodiment of the method according to the present invention which utilizes a second heat source.
Figure 3:
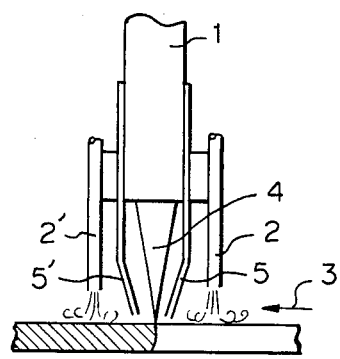

The second heat sources 2, 2' shown in FIGS. 1 and 2 are induction-heating sources while the second heat sources 2, 2' shown in FIGS. 3 and 4 are combustion-gas heating sources. The shield plates 5, 5' are provided for shielding the plasma of a laser beam against the disturbance created by the combustion gas. The induction-heating sources can be easily controlled and handled. The combustion-gas heating sources are advantageous because inexpensive gas can be used. The kinds of second heat sources 2, 2' are not limited to those described above.

According to a preferred embodiment of the present invention, the first, second, and third heat sources can be used for working, second preheating and postheating, and first preheating, respectively. In this embodiment, a workpiece is preheated by the third heat source, and the preheated workpiece is mounted on a laser working machine, in which a laser-beam condenser (the first heat source) and the second heat source are installed side by side. The second heat source further preheats the workpiece to achieve a target preheating temperature. This embodiment using the three heat sources makes it possible to work a large-sized workpiece at a high speed without the occurrence of thermal cracks.

Table 2 below shows the surface-melting working methods according to the present invention and the prior art. In these methods, the second heat source 2' (FIG. 4) for postheating is not used.

The material of the workpieces is tool steel containing 17.4% Cr, 1.78% W, 0.92% Ni, and 1.74% C.

This grade of tool steel is susceptible to thermal cracking. The thermal cracks propagate across the chromium carbides which are precipitated in the grain boundaries during the casting of the tool steel. When the surface of the tool steel is melted to refine the crystal grains approximately 50–100 μm in size to approximately 5 μm in size, the chromium carbides are finely distributed, thereby lessening the number of sites where the thermal cracks propagate. Nevertheless, the rapid heating and rapid cooling during the surfacemelting treatment are liable to result in thermal cracks due to thermal stress.

In the inventive method (1), preheating and postheating up to 700° C. were carried out by means of the second heat source 2 (FIG. 4). The workpiece was rotated during preheating, working, and postheating at a circumferential speed of 70 mm/sec.

In the inventive method (2), a furnace was used as the third heat source to heat the workpiece up to 600° C. Directly after furnace heating, the workpiece was heated by the second heat source and then by the first heat source.

In the known method, serious cracks frequently occur. In the inventive method (1), the occurrence of thermal cracks is prevented and a working speed of 70 mm/sec, which is 40 mm/sec higher than that of the known method, is attained. In the inventive method (2), the occurrence of thermal cracks is prevented and a high working speed of 90 mm/sec is attained. Directly after the laser working, postheating is carried out, and sometime during postheating a finishing heat treatment of the workpiece is carried out in the furnace. Therefore, there is no danger of cold cracks occurring and even adjustment of the hardness can be attained at one step.

as to smooth it. In this embodiment, in addition to smoothening the ripple-like surface, the blowholes and internal cracks of the surface layer are eliminated due to the bonding of metal around the blowholes and internal cracks, and the tensional stress, which is induced in the solidified surface layer due to thermal shrinkage, is lessened. As a result of the lessening of the tensional stress, the generation of cracks during a subsequent

TABLE 2

|  | Know Method | Inventive Method (1) | Inventive Method (2) |
| --- | --- | --- | --- |
| Kind of Working | melting of surface layer | ← | ← |
| Material of Workpiece | 17Cr 2W1Ni | ← | ← |
| Diameter of Workpiece (mm) | 124 |  |  |
| Maximum Fusion Depth (mm) | 6 | ← | ← |
| Laser Power (Kw) | 10 | ← | ← |
| Preheating by Second Heat Source | none | oxygen-acetylene gas 700° C. | oxygen-acetylene gas 800° C. |
| Postheating by Second Heat Source | none | ↑ | oxygen-acetylene gas 900° C. |
| Preheating by Third Heat Source | none | none | furnace heating 600° C. |
| Postheating by Third Heat Source | none | none | furnace heating 600° C. |
| Maximum Working Speed (mm/s) | 40 | 70 | 90 |
| Occurrence of Thermal Cracks | frequent occurence of serious cracks | none | none |
| Finishing Heat Treatment | necessary | necessary | unnecessary |

The six examples of surface-alloying by the method described above are given in Table 3. In all of the examples, the additive, i.e., Al, was enriched in the surface layer of the base metal; that is, the Al was alloyed with the base metal on its surface. Thus, the surface-alloyed product according to the present invention exhibited properties superior to those of the base metal.

The influence of alloying elements, such as Ni, Cr, Mo, W, V, Co, Cu, C, and Si, upon the properties of steel material is well known and therefore is not described herein.

cooling step is unlikely. The forming installation can be a small-sized, inexpensive one because the force required for forming the surface alloyed layer is extremely small when forming is carried out directly after solidification.

Figure 7:
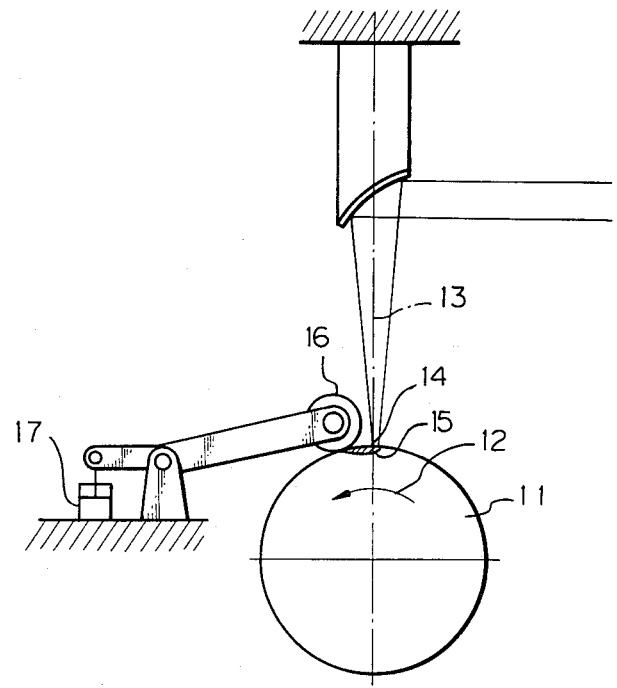
FIG. 7 shows an example of the pressure-forming device used in the method of the present invention.

Referring to FIG. 7, an example of the forming installation is shown.

A cylindrical workpiece 11 is irradiated with a laser beam 13 while being rotated in the direction of the arrow 12. The surface layer 14 of the cylindrical workpiece 11 is rapidly heated locally to form a molten part

TABLE 3

|  | Case (1) | Case (2) | Case (3) | Case (4) | Case (5) | Case (6) |
| --- | --- | --- | --- | --- | --- | --- |
| Kind of Working | melting of surface layer | ← | ← | ← | ← | ← |
| Chemical Composition of Base Metal (%) |  |  |  |  |  |  |
| C | 0.39 | 0.31 | 1.56 | 0.49 | 0.11 | 0.31 |
| Si | 0.99 | 0.41 | 0.17 | 0.20 | 0.14 | 0.25 |
| Mn | 0.44 | 0.60 | 0.45 | 9.66 | 1.55 | 0.49 |
| Ni | — | 1.17 | — | — | 30.2 | — |
| Cr | 5.13 | 2.88 | 9.22 | 9.18 | 9.2 | 2.60 |
| Mo | 1.22 | — | 0.51 | — | — | — |
| V | 0.36 | — | — | — | — | — |
| Co | — | — | — | (N: 0.37) | — | — |
| Maximum Fusion Depth (mm) | 3 | ← | ← | ← | ← | ← |
| Laser Power (KW) | 10 | ← | ← | ← | ← | ← |
| Preheating by Third Heat Source | furnace heating 500° C. | ← | ← | ← | ← | ← |
| Working Speed (mm/s) | 8 | ← | ← | ← | ← | ← |
| Deoxidizing Agent | aluminum | ← | ← | ← | ← | ← |
| Low-Melting-Point Metal | → | ← | ← | ← | ← | ← |

An embodiment of the method according to the present invention is now described. A ripple-like surface of a workpiece which is formed during the melting of a metallic surface of the workpiece is pressed during or directly after solidification with a roller or a hammer so as to smooth it. 15. A pressing roller 16 is located in the advancing direction of the workpiece as seen from the molten part 15 so as to press and deform the molten part 15. A cylinder 17 is connected via levers to the pressing roller

16 so as to allow the pressing force and amount to be adjusted.

Using the forming installation shown in FIG. 7, a cylindrical workpiece 200 mm in diameter was irradiated with a laser beam focussed to a diameter of 4 mm so as to melt the surface layer. The pressing roller 16, 50 mm in diameter and 10 mm in width, was positioned 30 mm from the molten surface layer in the rotating or advancing direction. A force of only 2 kg mm$^2$ was applied to the pressing roller. The working conditions were the same as those in Table 1.

The laser-irradiated surface of the workpiece was smoothened by the pressing roller, and the size of the blowholes and thermal cracks was decreased to considerably less than that of Table 1.

Now is described an embodiment of the present invention, wherein the solidified part of the base metal which has been alloyed with the aid of a high-density energy beam is cut with a high-density energy beam to expose an alloyed layer of a uniform concentration on the so-cut cross section of the base metal and so that the cut sections having this exposed alloyed layer can be used to produce cutters and heat-resistant and wear-resistant tools.

The workpiece is surface-alloyed by any one of the embodiments described above and is then divided or cut at the center so as to form workpiece sections. As a result, the surface-alloyed part is exposed at the cut sections of the workpiece. In order to cut a workpiece into the sections mentioned above by means of a high-density energy beam, the diameter of the beam must be lessened so as to enhance the energy density as compared with that of the high-density energy beam used for alloying. Evidently, the surface-alloyed part of a workpiece can be cut at a position which is slightly displaced from the center of the surface-alloyed area so that one of the cut sections has a wide surface-alloyed area. In this embodiment, a high-density energy beam is used for cutting since the base metal, in which heat-resistant and wear-resistant elements are enriched due to surface-alloying, is easily cut by such beam but not by a mechanical means and since the high-density energy of such beam remelts the additive, which is further uniformly distributed over a cut surface. Two workings in this embodiment, i.e., the working for alloying and the working for cutting by means of a high-density energy beam, are preferably carried out successively in the same NC working machine. When a laser beam is used as a high-density energy beam, the laser beam for alloying may be a continuous $CO_2$ laser beam and the laser beam for cutting may be a pulse $CO_2$ laser beam which can provide the cut surface with excellent properties.

When the additive is fusion-bonded to the base metal prior to the melting thereof, a high-density energy beam can be used for the fusion-bonding provided that the high-density energy beam is weakened or the working speed is increased to such a degree that melting of the base metal does not result.

Figure 8A:
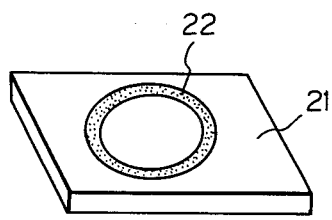
FIG. 8 illustrates a cutting procedure carried out in the method of the present invention.
Figure 9A:
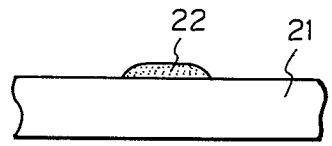
FIG. 9 is a cross-sectional view of FIG. 8.
Figure 8B:
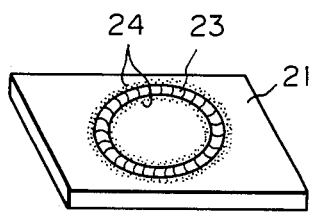
Figure 9B:
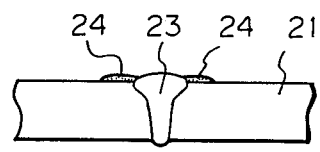
Figure 8C:
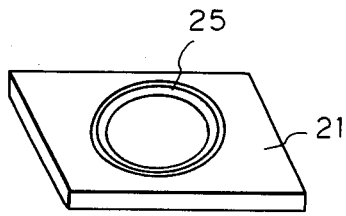
Figure 9C:
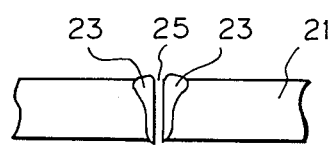

Referring to FIGS. 8(A), 8(B), and 8(C), an example of the method according to the present invention is illustrated. This example is now described with reference to FIGS. 8(A), 8(B), and 8(C) and FIGS. 9(A), 9(B), and 9(C) showing an alloy layer exposed on the cut cross section of a sheet.

A mixture 22 of aluminum powder and tungsten powder in a 1:1 ratio was sprayed in a dispersing manner on the surface of a 2 mm-thick carbon-steel sheet 21. A laser beam with a power of 5 kW was focussed to a diameter of 8 mm. The steel sheet 21 was displaced relative to the laser beam at a speed of 80 mm/sec. The mixture 22 was irradiated with the laser beam to melt the aluminum and, hence, fusion-bond the mixture to the steel sheet 21 (FIG. 8(A)).

A laser beam having a power of 5 kW was focussed to a diameter of 8 mm, and the steel sheet 21 was displaced relative to the laser beam at a speed of 80 mm/sec (FIG. 8(B)).

Subsequently, a laser beam having a power of 8 kW was focussed to a diameter of 0.8 mm and was applied to the same area on the steel sheet 21 as in the step shown in FIG. 8(B). Argon gas was blown onto the irradiation area of the laser beam at a pressure of 5 kg/cm$^2$ and at a rate of 5 liters per minute. The steel sheet 21 was cut at a speed of 80 mm/sec and virtually at the center of the irradiation area of the laser beam in the step of FIG. 8(B). This cutting step is shown in FIG. 8(C).

Tungsten was incorporated into the molten part in an amount of from 10% to 25% by weight. The molten part exhibited, after solidification, a vickers hardness of 560 and, hence, a considerable hardening compared to a base metal having a vickers hardness of 220.

When the step shown in FIG. 8(A) was omitted for the purpose of comparison, the amount of tungsten incorporated was disadvantageously low and varied. This led to a disadvantageous variation in the qualities of the surface-alloyed layer.

When an electron beam was used instead of a laser beam, the same results were obtained, but the cut surface obtained with the electron beam was not as clean as that obtained with the laser beam. A gas, such as argon, blown simultaneous with the application of the laser beam, cleaned the cut surface to a certain extent.

As will be understood from the foregoing descriptions, especially the examples, the method of the present invention is useful for producing metallic tools or mechanical parts which are locally alloyed at a high alloy concentration and which exhibit heat-resistant and wear-resistant properties superior to those of monolithic tools and the like. In addition, the surface-alloying and cutting can be carried out at one stroke, and the tools and the like provided by the method of the present invention have or virtually have the shape of the finished product when they are cut by means of a high-density energy beam.

I claim:

1. A method for producing a surface-alloyed article consisting of a metal base and a surface-alloy layer, wherein the surface alloy layer comprises a metal having a lower melting point than that of the base metal, a deoxidation product, and an alloying element which is enriched in the surface-alloy layer, and wherein the surface-alloy layer is solidified on the base metal by solidification of a melt formed by utilizing a high-density energy beam, said method comprising:

applying or fusion-bonding to the base metal an additive comprising a deoxidizing agent which is more oxidizable than the base metal, a low melting-point metal which has a lower melting point than that of the base metal, and an alloying element which has a different composition from that of the deoxidizing agent and the low-melting point metal;

displacing the source of the high energy beam relative to the base metal, preventing any other materials of the additive from scattering by melting the applied or fusion-bonded low melting-point metal, then melting a surface of the base metal as well as the deoxidizing agent and alloying element at the same location to form a melt mixture consisting essentially of the base metal, the low melting-point metal, the alloying element, and the deoxidizing agent; the resultant metal mixture being either covered by an inert gas, gas that is nonreactive with the melt mixture or being located in a vacuum;

deoxidizing the melt mixture with the deoxidizing agent, provided that when the low-melting-point metal and the deoxidizing agent are the same, the deoxidizing agent remains partially non-oxidized; and solidifying the melt to form the surface alloyed layer.

2. A method according to claim 1, wherein said base is a steel-based or iron-based alloy and the deoxidizing agent comprises at least one member selected from the group consisting of aluminum, silicon, manganese, titanium, zirconium, vanadium, and an alloy thereof.

3. A method according to claim 1, wherein the base metal is a steel-based or iron-based alloy and the low-melting-point metal comprises at least one member selected from the group consisting of Al, Sn, Cu, TiFe, TiAl$_3$, and suboxides thereof.

4. A method according to claim 1, wherein said base is a steel-based or iron-based alloy and said additive comprises at least one alloying element selected from the group consisting of nickel, chromium, cobalt, tungsten, vanadium, molybdenum, copper, carbon, and silicon.

5. A method according to claim 1, 2, or 3, further comprising disposing a second heat source comprising a burner or an induction heater in front of the irradiation area of a high-density energy beam.

6. A method according to claim 5, wherein the step of disposing a second heat source in front of the irradiation area of a high-density energy beam comprises imparting to the additive and base metal a substantial part of the heat energy required for surface-alloying, said part being less than that of the high-density energy beam.

7. A method according to claim 1, 2, 3, or 4 further comprising pressing the melted and alloyed surface of the base metal during or directly after solidification with a roller or hammer.

8. A method according to claim 1, 2, or 3, further comprising cutting the solidified part of the base metal which has been alloyed with the aid of a high-density energy beam with a high-density energy beam to expose an alloyed layer of a uniform concentration.

9. A method according to claim 1, 2, 3, or 4, wherein the step of fusion-bonding the additive to the base metal prior to the melting thereof comprises fusion-bonding by means of a high-density energy beam which is weakened or whose displacement speed is increased to such a degree that melting of the base metal does not result.

* * * * *